(12) United States Patent
Hasegawa et al.

(10) Patent No.: US 7,865,961 B2
(45) Date of Patent: Jan. 4, 2011

(54) COMPUTER SYSTEM, CENTRAL UNIT, AND PROGRAM EXECUTION METHOD

(75) Inventors: Eiji Hasegawa, Kawasaki (JP); Takuya Sakamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1073 days.

(21) Appl. No.: 10/876,595

(22) Filed: Jun. 28, 2004

(65) Prior Publication Data
US 2005/0188223 A1     Aug. 25, 2005

(30) Foreign Application Priority Data
Feb. 23, 2004    (JP) ............................. 2004-046291

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G06F 11/30* (2006.01)
*G06F 13/28* (2006.01)
*G11C 7/00* (2006.01)
*H04N 7/16* (2006.01)
*H04L 29/06* (2006.01)
*B41K 3/38* (2006.01)
*H03K 19/00* (2006.01)

(52) U.S. Cl. .......................... 726/26; 726/16; 713/165; 713/167; 713/187; 713/189; 380/59; 326/8; 711/163

(58) Field of Classification Search ......... 717/106–108, 717/120–122, 136, 151, 159, 162, 168–178; 713/191; 726/26–27, 31
See application file for complete search history.

(56) References Cited

U.S. PATENT DOCUMENTS 5,892,899 A * 4/1999 Aucsmith et al. ............. 726/27

(Continued)

FOREIGN PATENT DOCUMENTS

JP          8-016385          1/1996

(Continued)

OTHER PUBLICATIONS

Japanese Office Action mailed Feb. 16, 2010 and issued in corresponding Japanese Patent Application 2004-046291.

*Primary Examiner*—Nasser Moazzami
*Assistant Examiner*—Oscar A Louie
(74) *Attorney, Agent, or Firm*—Staas & Halsey LLP

(57) ABSTRACT

In a program execution method in which a program to be executed is stored in a central unit and a terminal unit acquires the program from the central unit and executes the program, when the central unit receives an acquisition request from the terminal unit, it creates a load module different from the program, which produces the same computation results and differs in the location where essential information is to be embedded, and transmits the load module to the terminal unit together with the essential information necessary for executing the program. The terminal unit receives the program, stores the program on a memory, and executes the program based on the embedded essential information. This method makes it difficult for malicious third parties to illegally execute the program by reverse analysis, and enhances the security of the load module to be executed.

3 Claims, 9 Drawing Sheets

U.S. PATENT DOCUMENTS

| | | | |
|---|---|---|---|
| 6,006,328 A * | 12/1999 | Drake | 726/23 |
| 6,327,661 B1 * | 12/2001 | Kocher et al. | 713/193 |
| 6,334,189 B1 * | 12/2001 | Granger et al. | 726/26 |
| 6,480,959 B1 * | 11/2002 | Granger et al. | 713/189 |
| 6,598,166 B1 * | 7/2003 | Folmsbee | 713/190 |
| 6,643,775 B1 * | 11/2003 | Granger et al. | 726/26 |
| 6,668,325 B1 * | 12/2003 | Collberg et al. | 726/26 |
| 6,694,435 B2 * | 2/2004 | Kiddy | 726/26 |
| 7,150,003 B2 * | 12/2006 | Naumovich et al. | 717/108 |
| 7,343,619 B2 * | 3/2008 | Ofek et al. | 726/2 |
| 2004/0103404 A1 * | 5/2004 | Naumovich et al. | 717/136 |

FOREIGN PATENT DOCUMENTS

| | | |
|---|---|---|
| JP | 11-232103 | 8/1999 |
| JP | 2000-76064 | 3/2000 |
| JP | 2001-265581 | 9/2001 |
| JP | 2002-132371 | 5/2002 |
| JP | 2002-514333 | 5/2002 |
| JP | 2002-333927 | 11/2002 |
| JP | 2003-050640 | 2/2003 |

* cited by examiner

FIG. 3

30
| pop ebx |
| add ebx, 5000 |
| xor eax, eax |

31
| mov eax, 1000 |
| mul eax, 5 |
| pop ebx |
| add ebx, [eax] |
| xor eax, eax |

32
| pop eax |
| mov ebx, 5000 |
| add ebx, eax |
| mov eax, 0 |

COMPUTER SYSTEM, CENTRAL UNIT, AND PROGRAM EXECUTION METHOD

CROSS-REFERENCE TO RELATED APPLICATION

This non-provisional application claims priority under 35 U.S.C. §119(a) on Patent Application No. 2004-046291 filed in Japan on Feb. 23, 2004, the entire contents of which are hereby incorporated by reference.

BACKGROUND OF THE INVENTION

The present invention relates to a computer system, a central unit and a program execution method which make it difficult to illegally execute a program even when a malicious third party reverse-analyzed the contents of the executed program.

In recent years, with the spread of an "always-on" connection environment such as a broadband internet connection, techniques for ensuring security against illegal execution and update of programs by malicious third parties have attracted attention. In particular, personal computers (hereinafter just referred to as the "PC") have an open architecture, and programs to be executed on the PC are written as an operating system (hereinafter just referred to as the "OS") or a program code in a form complying with a processor. Therefore, since any person can basically confirm and understand the contents of the main memory on the PC, there is the problem that it is difficult to ensure security.

In order to solve the problem, the prior art uses the technique of making it difficult to read a program to be executed or the technique of securing a program to be executed, and, for example, takes countermeasures such as making the reverse analysis difficult by obfuscating the logic of the program, encrypting the program, or executing the program while actively writing the program on the memory (see Japanese Patent Application Laid-Open No. 11-232103/1999).

Moreover, Japanese Patent Application Laid-Open No. 8-16385/1996 discloses a software analysis protection method in which software for use in an application is divided and stored in a central unit and a terminal unit, and a load module to be transmitted to the terminal unit is selected by random number control. In this software analysis protection method, all the software programs are not simultaneously present in the terminal unit, and reverse analysis results obtained by executing the same processing are different. In other words, by embedding an appropriate sub-program into a program written on the memory of the terminal unit and executing the program, even when reverse analysis is successfully completed, the overall program cannot be understood. Further, the person who executed reverse analysis cannot readily execute the program.

BRIEF SUMMARY OF THE INVENTION

The present invention has been made with the aim of providing a computer system, a central unit and a program execution method which can make it difficult for malicious third parties to illegally execute a program by reverse analysis and can enhance the security of a load module to be executed.

In order to achieve the above object, a computer system of a first aspect of the invention is a computer system comprising a central unit and one or a plurality of terminal units connected to the central unit, wherein a load module of a program to be executed by the terminal unit is stored on a first memory of the central unit, and a necessary program is acquired from the central unit and executed by the terminal unit, the terminal unit comprises means for transmitting an acquisition request for a program to the central unit, the central unit comprises a program storage section storing a load module of a program to be executed by the terminal unit on the first memory, essential information storage section storing essential information necessary for executing the program, means for analyzing a load module of a program when an acquisition request for the program is received from the terminal unit, and creating a load module having a source code different from the program, which is located at an area before an address where the essential information is to be embedded, produces same computation results, and differs in the location where the essential information is to be embedded, and means for transmitting the created load module of the program together with the essential information to the terminal unit, and the terminal unit further comprises means for receiving the load module of the program transmitted by the central unit, means for storing the received load module of the program on a second memory, and means for acquiring information necessary for executing the load module of the program based on the essential information from the central unit or a device connected to the central unit over a network.

In the computer system of the first aspect of the invention, a load module of a program to be executed by the terminal unit is stored in the central unit, and the terminal unit transmits an acquisition request for a program to the central unit when executing the program. The central unit that has received the acquisition request analyzes the load module of the program and creates a load module having different source code which is located at an area before an address where the essential information is to be embedded, produces the same computation results, and differs in the location where the essential information is to be embedded. The created program is transmitted together with the essential information to the terminal unit. The essential information is information necessary for meaningfully executing the program. For example, the essential information is execution permission information for the program, or decoding key information for decoding the code of contents information dealt with by the program. Moreover, the essential information includes original information required to compute information necessary for meaningfully executing the program, and a computation method. The essential information is updated by the central unit at appropriate time intervals, or each time a program acquisition request is made. When the terminal unit starts to execute the program, it acquires information necessary for executing the program based on the essential information from the central unit or a device connected to the central unit over a network. If the essential information is wrong, the program cannot be meaningfully executed. Thus, since the address of the essential information contained in the load module or the computation method can be changed each time the program is executed, it is difficult for malicious third parties to determine the storage address of the essential information necessary for executing the program in one way. Further, even when a program is analyzed by a malicious third party, since the essential information can be updated at appropriate time intervals, or each time the program is acquired, it is possible to invalidate the essential information embedded in the analyzed program.

A computer system according to a second aspect of the invention is based on the first aspect of the invention and characterized in that the central unit stores a source code for a program to be executed by the terminal unit on the first memory, and further comprises means for changing the source code for the program located at an area before the address where the essential information is to be embedded or changing a compile and link process so as to create a load module of a program different from the program, which produces same computation results and differs in the location where the essential information is to be embedded, when the acquisition request is received from the terminal unit, and means for transmitting the created load module of the program to the terminal unit. Note that "changing the compile and link process" sections creating a load module having a different instruction code or address allocation from the same source code.

In the computer system of the second aspect of the invention, the source code for the program to be executed by the terminal unit is stored in the central unit. When executing the program, a load module is created by compiling and linking the source code for the program. At this time, by changing the source code or changing the compile and link process, a load module different from the program, which produces same computation results and differs in the location where the essential information is embedded, is created. The created load module is transmitted to the terminal unit together with essential information for acquiring information necessary for executing the program. Since a different load module is created when making an analysis and change based on the source code, or compiling and linking the source code, it is possible to make a minute change in the load module based on the analysis of the source code as compared to the case where the load module is analyzed and changed.

A computer system according to a third aspect of the invention is based on the first or second aspect of the invention and characterized in that the central unit divides a program to be executed by the terminal unit in advance and stores a part of the sub-programs thus made on the first memory, and further comprises means for creating a load module of a sub-program different from the program, which produces same computation results and differs in the location where the essential information is to be embedded, when the acquisition request is received from the terminal unit, and the terminal unit stores other sub-programs on the second memory, and further comprises means for receiving the sub-program transmitted by the central unit, means for storing the received sub-program on the second memory, and means for acquiring a necessary sub-program from the central unit and executing the program.

In the computer system of the third aspect of the invention, a program to be executed by the terminal unit is divided and stored in the central unit and the terminal unit in a divided manner. When the program is executed by the terminal unit, at a timing at which a sub-program which is not present in the terminal unit but is present in the central unit is necessary, an acquisition request for the sub-program is transmitted to the central unit from the terminal unit. In response to the acquisition request for the sub-program, the central unit creates a sub-program different from the program, which produces same computation results and differs in the location where the essential information is to be embedded. The created sub-program is transmitted to the terminal unit after embedding essential information necessary for executing the program therein. The terminal unit executes the acquired sub-program. Thus, by embedding the essential information into the sub-program, it is possible to update the essential information and the load module of the sub-program even when the program is being executed. It is therefore difficult for malicious third parties to analyze the load module during the execution of the program and use the program. Besides, even when the third parties succeeded in reverse analysis, they cannot illegally execute the program, and thus it is possible to improve the security of the program to be executed.

A computer system according to a fourth aspect of the invention is based on the third aspect of the invention and characterized in that the terminal unit further comprises means for deleting an executed sub-program from the second memory after executing the sub-program, or means for overwriting the sub-program on the second memory with invalid data.

In the computer system of the fourth aspect of the invention, after executing the sub-program, the sub-program stored on the memory is deleted from the memory as the execution of the sub-program is completed, or the sub-program is overwritten with invalid data. Thus, all the sub-programs of the program to be executed are not stored on the memory. Moreover, even when a malicious third party tries to perform reverse analysis, it is difficult for the third party to understand the overall program to be executed, thereby ensuring the security of the program to be executed.

A computer system according to a fifth aspect of the invention is based on any one of the first through fourth aspects of the invention and characterized in that the terminal unit transmits user information to the central unit when requesting acquisition of a program, the central unit or a device connected to the central unit over a network stores the essential information in association with the user information, and the terminal unit transmits the user information to the central unit or the device connected to the central unit over a network so as to allow only an authorized user to execute the program based on the essential information corresponding to the user information.

In the computer system of the fifth aspect of the invention, the terminal unit transmits user information when requesting acquisition of a program. In the central unit, the essential information to be embedded into the program is stored in association with the user information. The program transmits the user information and the essential information embedded in the program or information computable from the essential information to the central unit or a device connected to the central unit over a network. The central unit or the device connected to the central unit over a network performs the process of authentication, etc. by collating the received user information and essential information with the user information and essential information stored in the central unit. Thus, since the program cannot be executed by a person other than the user who has acquired the program from the central unit, and it is possible to ensure the security of the program to be executed.

A computer system according to a sixth aspect of the invention is based on any one of the first through fourth aspect of the invention and characterized in that the central unit further comprises means for creating, at appropriate time intervals, a program including a different load module from the program, which produces same computation results and differs in the location where the essential information is to be embedded, and means for updating the program stored on the first memory with the program created by the means.

In the computer system of the sixth aspect of the invention, the program having a different load module, which produces the same computation results and differs in the location where the essential information is to be embedded, is created at appropriate time intervals, and the memory of the central unit is updated. Thus, even when a malicious third party who has succeeded in reverse analysis of a program code on the terminal unit, it is difficult for the third party to determine unique information necessary for execution and the storage address of the information in one way because the program is always updated when executing the program. Therefore, since the third party cannot illegally execute the program, it is possible to ensure the security of the program to be executed.

A central unit according to a seventh aspect of the invention comprises a program storage section storing a load module of a program to be executed by a terminal unit on a first memory, an essential information storage section storing essential information necessary for executing the program, means for analyzing a load module of a program when an acquisition request for the program is received from the terminal unit, and creating a load module having a different source code from the program, which is located at an area before an address where the essential information is to be embedded, produces same computation results and differs in the location where the essential information is to be embedded, and means for transmitting the created load module of the program together with the essential information to the terminal unit.

In the central unit of the seventh aspect of the invention, a load module of a program to be executed by the terminal unit is stored in the central unit. When executing the program, the terminal unit transmits an acquisition request for the program to the central unit. The central unit that has received the acquisition request analyzes the load module of the program, and creates a load module having a different source code which is located at an area before an address where the essential information is to be embedded, produces the same computation results and differs in the location where the essential information is to be embedded. The central unit transmits the created program together with the essential information to the terminal unit. The essential information is information necessary for meaningfully executing the program. For example, the essential information is execution permission information for the program, or decoding key information for decoding the code of contents information dealt with by the program. Moreover, the essential information includes original information required to compute information necessary for meaningfully executing the program, and a computation method. The essential information is updated by the central unit at appropriate time intervals, or each time a program acquisition request is made. When the terminal unit starts to execute the program, it acquires information necessary for executing the program based on the essential information from the central unit or a device connected to the central unit over a network. If the essential information is wrong, the program cannot be meaningfully executed. Thus, since the address of the essential information contained in the load module or the computation method can be changed each time the program is executed, it is difficult for malicious third parties to determine the storage address of the essential information necessary for executing the program in one way. Further, even when the program is analyzed by a malicious third party, since the essential information can be updated by the central unit at appropriate time intervals, or each time the program is acquired, it is possible to invalidate the essential information embedded in the analyzed program.

Next, in order to achieve the above-mentioned object, a program execution method according to an eighth aspect of the invention is a program execution method using a central unit and one or a plurality of terminal units connected to the central unit, wherein program to be executed by the terminal unit is stored on a first memory of the central unit, and a necessary program is acquired from the terminal unit and executed by the terminal unit, and causing the terminal unit to transmit an acquisition request for a program to the central unit, causing the central unit to perform the operations of storing a load module of the program to be executed by the terminal unit, storing essential information necessary for executing the load module of the program, and, when the acquisition request is received from the terminal unit, analyzing a load module of a corresponding program and creating a load module having a different source code from the program, which is located at an area before an address where the essential information is to be embedded, produces same computation results and differs in the location where the essential information is to be embedded, and transmitting the created load module of the program together with the essential information to the terminal unit, and further causing the terminal unit to receive the load module of the program transmitted by the central unit, storing the received load module of the program on a second memory, and acquiring information necessary for executing the load module of the program based on the essential information from the central unit or a device connected to the central unit over a network.

In the program execution method of the eighth aspect of the invention, a load module of a program to be executed by the terminal unit is stored in the central unit. When executing a program, the terminal unit transmits an acquisition request for the program to the central unit. The central unit that has received the acquisition request analyzes the load module of the program, and creates a load module having a different source code which is located at an area before an address where the essential information is to be embedded, produces same computation results and differs in the location where the essential information is to be embedded. Then, the created program is transmitted to the terminal unit together with the essential information. The essential information is information necessary for meaningfully executing the program. For example, the essential information is execution permission information for the program, or decoding key information for decoding the code of contents information dealt with by the program. Moreover, the essential information includes original information required to compute information necessary for meaningfully executing the program, and a computation method. The essential information is updated by the central unit at appropriate time intervals or each time a program acquisition request is made. When the terminal unit starts to execute the program, it acquires information necessary for executing the program based on the essential information from the central unit or a device connected to the central unit over a network. If the essential information is wrong, the program cannot be meaningfully executed. Thus, since the address of the essential information contained in the load module or the computation method can be changed each time the program is executed, it is difficult for malicious third parties to determine the storage address of the essential information necessary for executing the program in one way. Further, even when the program is analyzed by a malicious third party, since the essential information can be updated by the central unit at appropriate time intervals, or each time the program is acquired, it is possible to invalidate the essential information embedded in the analyzed program.

A program execution method according to a ninth aspect of the invention is based on the eighth aspect of the invention and characterized in that causing the central unit to perform the operations of storing a source code for a program to be executed by the terminal unit, when the acquisition request is received from the terminal unit, changing the source code for the program located at an area before an address where the essential information is to be embedded, or changing a compile and link process so as to create a load module of a program different from the program, which produces same computation results and differs in the location where the essential information is to be embedded, and transmitting the created load module of the program to the terminal unit.

In the program execution method of the ninth aspect of the invention, the source code for a program to be executed by the terminal unit is stored in the central unit. When executing the program, a load module is created by compiling and linking a source code for the program which differs in the location where the essential information is to be embedded. At this time, by changing the source code or changing the compile and link process, a load module which produces the same computation results and is different from the program is created. The created program is transmitted to the terminal unit together with the essential information for acquiring information necessary for executing the program. Since a different load module is created when making an analysis and change based on the source code, or compiling and linking the source code, it is possible to make a minute change in the load module based on the analysis of the source code as compared to the case where the load module is analyzed and changed.

A program execution method according to a tenth aspect of the invention is based on the eighth or ninth aspect of the invention and characterized in that causing the central unit to perform the operations of dividing a program to be executed by the terminal unit in advance and storing a part of the sub-programs thus made, and, when the acquisition request is received from the terminal unit, creating a load module of a sub-program different from the program, which produces same computation results and differs in the location where the essential information is to be embedded, and causing the terminal unit to perform the operations of storing other sub-programs, receiving the sub-program transmitted by the central unit, storing the received sub-program, acquiring a necessary sub-program from the central unit and executing the program.

In the program execution method of the tenth aspect of the invention, a program to be executed by the terminal unit is divided and stored in the central unit and the terminal unit in a divided manner. When the terminal unit executes the program, a sub-program acquisition request is transmitted to the central unit from the terminal unit at a timing at which a sub-program which is not present in the terminal unit but is present in the central unit is necessary. In response to the sub-program acquisition request, the central unit creates a sub-program which produces same computation results and is different from the program. The created sub-program is transmitted to the terminal unit after embedding essential information necessary for executing the program therein. The terminal unit executes the acquired sub-program. Thus, by embedding the essential information into the sub-program, it is possible to update the essential information and the load module of the sub-program even when the program is being executed. It is therefore difficult for malicious third parties to analyze the load module during the execution of the program and use the program. Besides, even when the third parties have succeeded in reverse analysis, since they cannot illegally execute the program, it is possible to ensure the security of the program to be executed.

The above and further objects and features of the invention will more fully be apparent from the following detailed description with accompanying drawings.

BRIEF DESCRIPTION OF THE SEVERAL VIEWS OF THE DRAWINGS

FIG. 3 is a view illustrating an example of the process of creating a new program by using a different instruction code;

DETAILED DESCRIPTION OF THE INVENTION

As described above, in a method using the technique of making it difficult to read a program to be executed or the technique of securing a program to be executed, irrespective of the degree of difficulty of reading the program or the degree of securing the program, the program ends up with a program written to be operated on an open architecture. Therefore, when a load module written on a memory is reverse-analyzed and instructions and data are examined according to the known open architecture, it is possible to analyze the contents of the program to be executed. Thus, there is the problem that it is impossible to prevent illegal attacks by third parties.

Besides, software for use in an application is divided and stored in a central unit and a terminal unit. Further, a load module to be transmitted to the terminal unit is selected by random number control. Consequently, even when all software programs are controlled not to be present simultaneously on the terminal unit, the addresses at which sub-programs are included in the program are present at certain addresses. Therefore, by obtaining image copies of the memory a plurality of times and comparing the obtained image copies, it is possible to readily find the addresses at which the sub-programs of the program are included. It is also possible to reverse-analyze the overall program. Thus, there is the program that it is impossible to prevent illegal attacks by third parties.

The present invention has been made with the aim of solving the above problems, and it is an object of the present invention to provide a computer system, a central unit and a program execution method, which can make it difficult for malicious third parties to illegally execute a program by reverse analysis and can enhance the security of a load module to be executed. Preferred embodiments of the present invention are given below.

Embodiment 1

Figure 1:
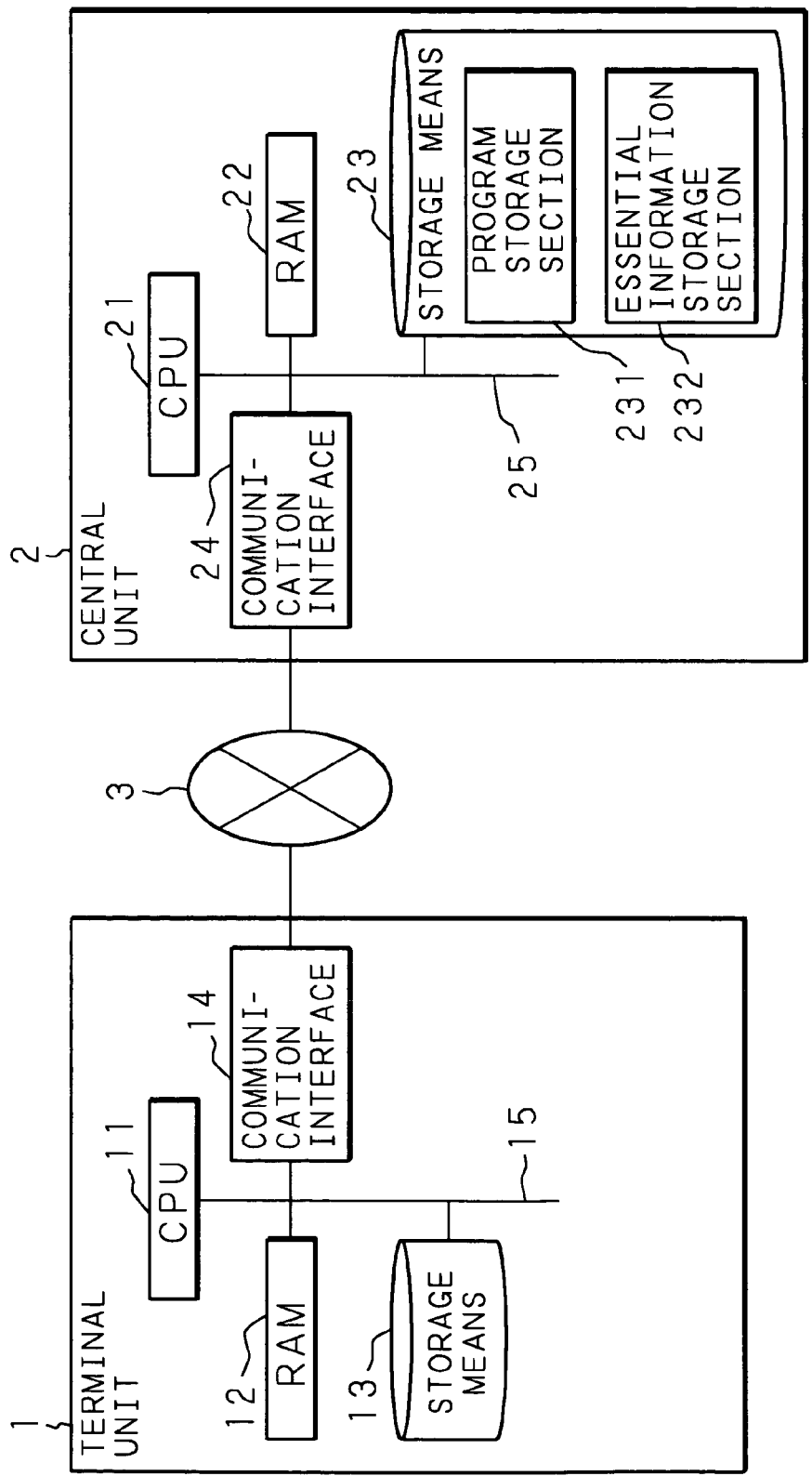
FIG. 1 is a block diagram illustrating the outline of a computer system according to Embodiment 1 of the present invention.

The following description will specifically explain a computer system according to Embodiment 1 of the present invention based on the drawings. FIG. 1 is a block diagram illustrating the outline of the computer system according to Embodiment 1 of the present invention. As shown in FIG. 1, the computer system of Embodiment 1 comprises a terminal unit 1 and a central unit 2, and the terminal unit 1 is connected to the central unit 2 through communication means, such as the Internet 3, so that the terminal unit 1 and the central unit 2 can communicate with each other. In Embodiment 1, an application program is executed on the terminal unit 1.

The terminal unit 1 comprises at least a CPU (Central Processing Unit) 11, a RAM 12, storage means 13, a communication interface 14 for connection to external communication means such as the Internet 3, and an internal bus 15 for connecting the above-mentioned hardware products.

The CPU 11 is connected to the above-mentioned hardware products in the terminal unit 1 through the internal bus 15, and controls the respective hardware products. The CPU 11 executes various software functions according to processing programs stored on the storage sections 13, for example, a program of loading and executing a program as a program loader. The storage sections 13 may be a built-in fixed-type storage device (hard disk), ROM, or a removable storage medium such as a DVD and a CD-ROM.

The RAM 12 is composed of an SRAM, a flash memory or the like, stores temporary data created during execution of software, and allows a program received from the central unit 2 to be written thereon.

The communication interface 14 is connected to the internal bus 15, and transmits and receives data necessary for processing by being connected to a cable such as a LAN and a WAN.

Similarly to the terminal unit 1, the central unit 2 comprises at least a CPU (Central Processing Unit) 21, a RAM 22, storage means 23, a communication interface 24 for connection to external communication means such as the Internet 3, and an internal bus 25 for connecting the above-mentioned hardware products.

The CPU 21 is connected to the above-mentioned hardware products in the central unit 2 through the internal bus 25, and controls the respective hardware products. The CPU 21 executes various software functions according to processing programs stored on the storage means 23. The storage means 23 includes a program storage section 231 for storing a load module of a program, and an essential information storage section 232 for storing essential information for executing a program. The storage means 23 may be a built-in fixed-type storage device (hard disk), ROM, or a removable storage medium such as a DVD and a CD-ROM.

The RAM 22 is composed of an SRAM, a flash memory or the like, stores temporary data created during execution of software, and allows a program stored in the essential information storage section 232 of the storage means 23 to be written thereon. When creating or updating a program, the essential information stored in the essential information storage section 232 of the storage means 23 is also written.

The communication interface 24 is connected to the internal bus 25, and transmits and receives data necessary for processing by being connected to a cable such as a LAN and a WAN.

Figure 2:
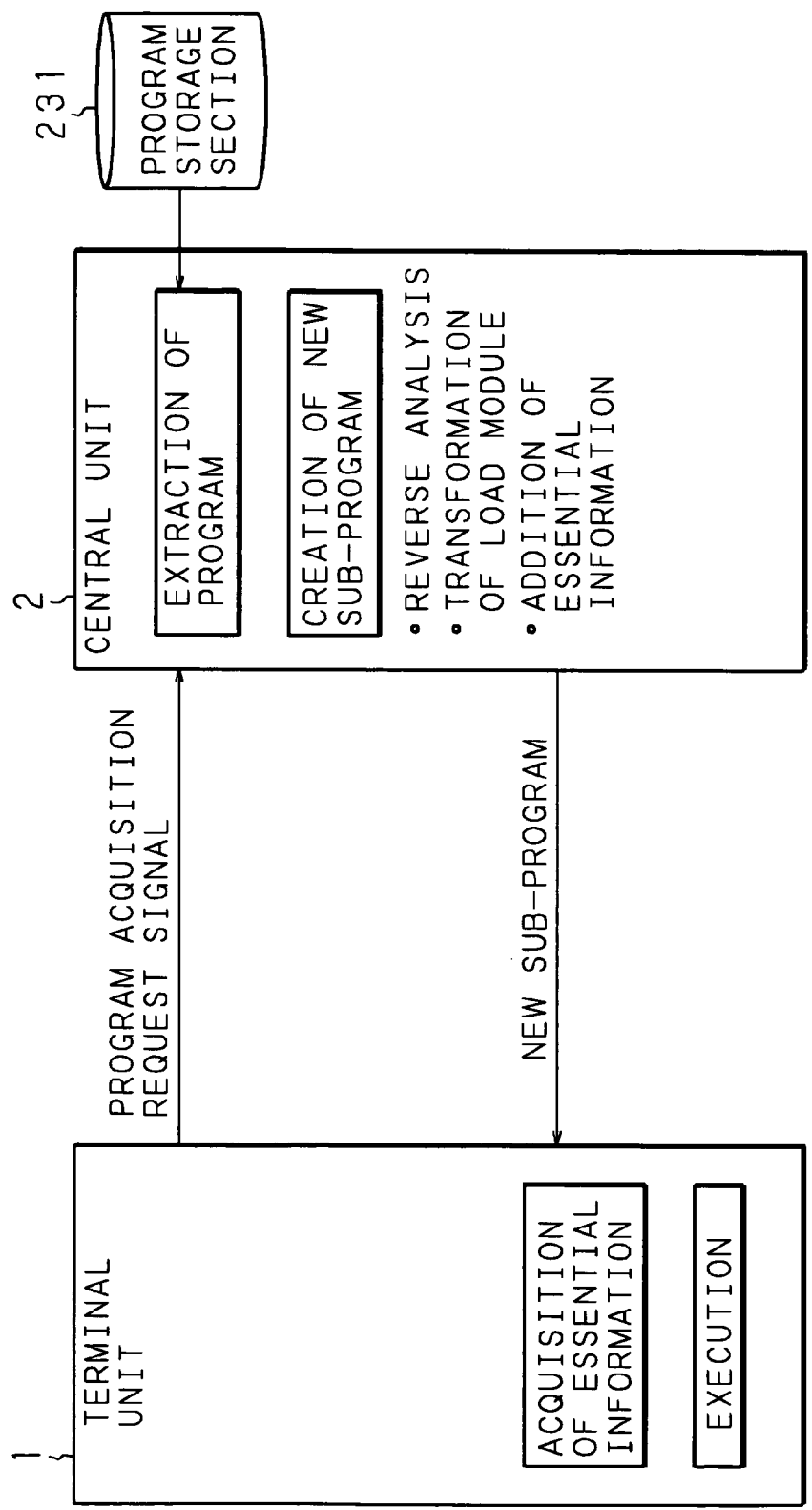
FIG. 2 is a view illustrating the operation for executing a program by the computer system according to Embodiment 1 of the present invention.

The following description will explain the operation of the computer system using the terminal unit 1 and central unit 2 having the above-described structures. FIG. 2 is a view illustrating the operation of executing a program by the computer system according to Embodiment 1 of the present invention.

First, a load module of a program to be executed is stored in the program storage section 231 of the central unit 2.

When executing the program to be executed, first, the CPU 11 of the terminal unit 1 transmits a program acquisition request signal to the central unit 2 over the Internet 3. The central unit 2 that has received the program acquisition request signal extracts a program to be executed from the programs stored in the program storage section 231, according to the acquisition request signal.

The CPU 21 of the central unit 2 reverse-analyzes the load module of the extracted program, and transforms the load module into a different load module which produces the same computation results. Then, the CPU 21 reads the essential information from the essential information storage section 232 and embeds it into the transformed load module to create a load module of a new program to be transmitted to the terminal unit 1. Note that the present invention is not limited to the method in which the load module is reverse-analyzed, and may be a method in which, for example, a load module is created by embedding the essential information into the source code of the program and compiling and linking the source code.

Figure 4:
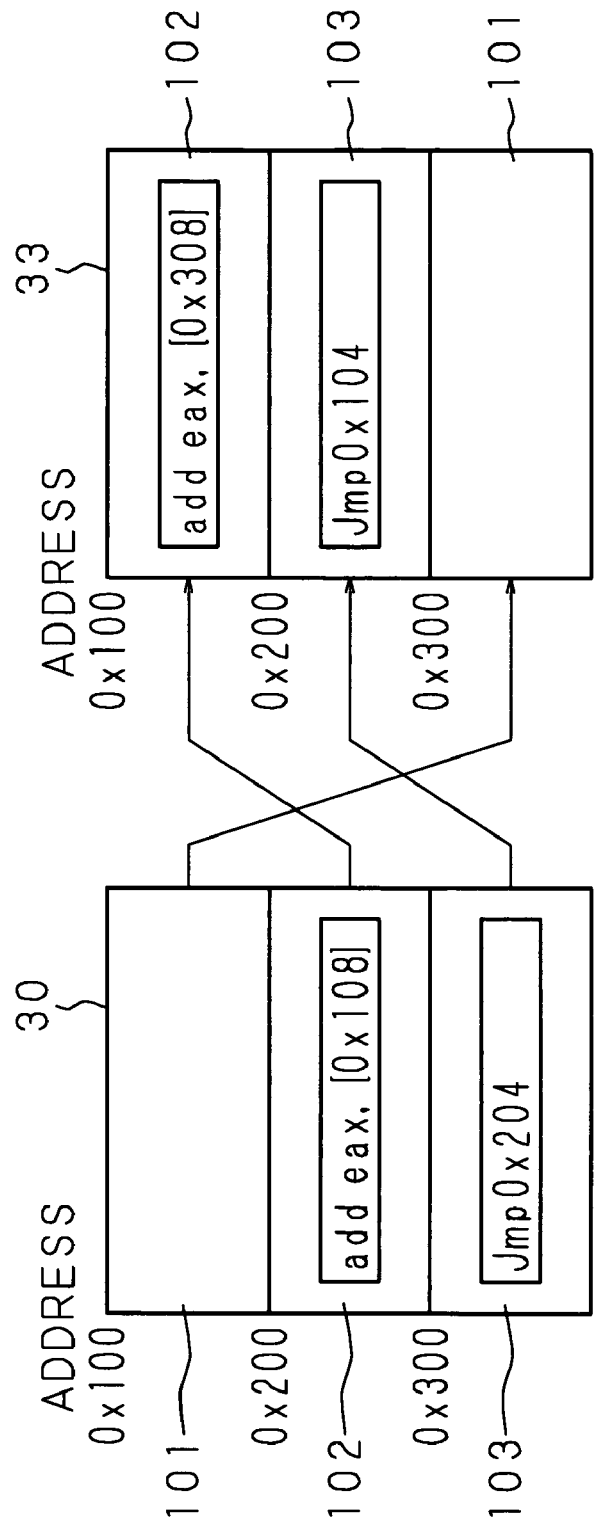
FIG. 4 is a view illustrating an example of the process of creating a new program by shuffling the position of instruction codes.

Specifically, in the above-described process of creating a new program to be transmitted to the terminal unit 1, a load module which produces the same computation results as the original program and is different from the original program is created by using a different instruction code as the instruction code for the original program, shuffling the position of the instruction codes, etc. FIGS. 3 and 4 are views illustrating examples of the process of creating a program to be transmitted to the terminal unit 1.

FIG. 3 is a view illustrating an example of the process of creating a new program by using a different instruction code. An instruction code 30 is an instruction code contained in the load module of the original program. In other words, the instruction code 30 is a program for storing a value obtained by adding '5000' to the value of the first data of a stack in a register ebx and clearing a register eax to 0 (zero).

Examples in which the instruction code is changed to produce the same computation results as the instruction code 30 of the original program are instruction codes 31, 32 of the program after the change. In the instruction codes 31, 32 of the program after the change, it can be understood by analysis of the instruction code 30 of the original program that the register eax is cleared to 0 (zero) in the end and that the computation results do not change after any operation is performed using the register eax during the period from the start of the program until the register eax is finally cleared to 0 (zero).

Using the above-mentioned facts, in the instruction code 31 of the program after the change, first, '1000' is substituted for the register eax and multiplied by '5'. At this time, '5000' is stored in the register eax. Then, the first data of stack data is read into the register ebx, and the value of the register eax is added.

By the processing performed so far, similarly to the original program, the value obtained by adding '5000' to the value of the first data of the stack is stored in the register ebx. Finally, the register eax is cleared to 0 (zero) to produce exactly the same computation results as the original program.

In the instruction code 32 of the program after the change, first, the value of the first data of the stack is stored in the register eax. Then, after reading '5000' into the register ebx, the value of the first data in the stack stored in the register eax is added.

By the processing performed so far, similarly to the original program, the value obtained by adding '5000' to the value of the first data of the stack is stored in the register ebx. Finally, by substituting 0 (zero) for the register eax to produce the same result, although the instruction code is different from the original program, exactly the same computation results as the instruction code of the original program are obtained.

FIG. 4 is a view illustrating an example of the process of creating a program to be transmitted to the terminal unit 1 by shuffling the position of instruction codes. In FIG. 4, the instruction code 30 of the original program is divided into three small programs 101 through 103 of addresses 0x100-0x200, 0x200-0x300, 0x300-0x400. When dividing the instruction code 30 into small programs, the instruction code 30 of the original program is analyzed and divided so that a single instruction or data sequence is not divided into a plurality of small programs.

Next, the positions of the small programs thus made are switched. Simultaneously, the address portion referring to the programs is rewritten to meet the switched positions.

For example, in the instruction code 30 in the load module of the original program, an instruction to add the data at the address 0x108 to the register eax, which is contained in the small program 102, refers to the small program 101 in the instruction code 30 of the original program. In an instruction code 33 after the transformation, since the small program 101 is located at the address 0x300, the portion referred to from the small program 102 is rewritten. In FIG. 4, the instruction code referring to the instruction address 0x108 is rewritten into an instruction code that refers to the address 0x308. The same processing is executed for the instruction codes of all the small programs. Consequently, a load module of a program having the instruction code 33 which produces the same computation results and is different from the instruction code 30 in the load module of the original program is created.

When the process of creating a load module of a program is completed, the CPU 21 of the central unit 2 transmits the created program to the terminal unit 1. The CPU 11 of the terminal unit 1 writes the received program on the RAM 12.

When the CPU 21 of the central unit 2 receives an acquisition request for the program, it stores the user information about the user who has transmitted the acquisition request. For example, the user information may be an IP address or any kind of the user's ID. In response to the acquisition request for the program, the CPU 21 transforms the load module of the corresponding program including the essential information.

Different essential information is created each time by using random numbers, etc., and the created essential information is embedded into the load module. When embedding the essential information, for example, the information about an essential information holding region that is a location where the essential information is to be embedded is stored separately from the load module of the program, and the essential information is embedded based on the information. In the example shown in FIG. 5, since the essential information holding region located at the address 100 before the transformation has been moved to the address 300 by the transformation of the instruction code, the essential information (in this embodiment, 01234567h) is written at the address 300.

Figure 6:
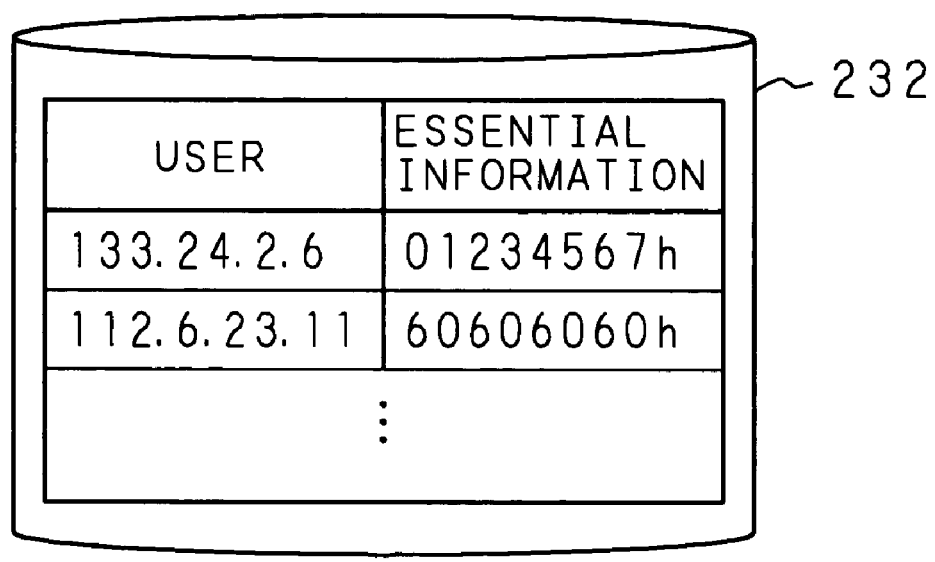
FIG. 6 is a view illustrating an example of the data structure in an essential information storage section showing the relationship between IP addresses and essential information.

In the central unit 2, the relationship between the user information of the user who has transmitted the acquisition request, for example, the IP address, and the corresponding essential information written in the essential information holding region is stored as a table in the essential information storage section 232 as shown in FIG. 6, for example. FIG. 6 is a view illustrating an example of the data structure in the essential information storage section 232 showing the relationship between the IP addresses and the essential information.

When executing the program by the terminal unit 1, the terminal unit 1 transmits the user information and essential information or information computable from the essential information, to the central unit 2. Only when the central unit 2 could have confirmed that the transmitted information is identical with the information in the essential information storage section 232, the central unit 2 transmits execution permission information to the terminal unit 1, and the terminal unit 1 that has received the execution permission information starts to execute the program.

Therefore, a malicious third party who has illegally acquired the program by image copies of the RAM 12, etc. and reverse-analyzed the program can not specify an address in the program at which the essential information is embedded. Further, the third party cannot receive transmission of the execution permission information by the central unit 2. It is thus possible to prevent the third party from illegally executing the program.

At this time, as the essential information, it is possible to use information necessary for meaningfully executing another program instead of the execution permission information. For example, in the case of a program for acquiring and using contents information from the central unit 2 or a device connected to the central unit 2 over a network, decoding key information for decoding the contents information acquired from the central unit 2 or the device connected to the central unit 2 over a network may be embedded as the essential information in the central unit 2.

In this case, when creating a program to be transmitted to the terminal unit 1 after transforming the load module of the original program, the CPU 21 of the central unit 2 embeds the decoding key information into the load module after the transformation. Then, the terminal unit 1 transmits an acquisition request for the contents information together with the user information to the central unit 2 or the device connected to the central unit 2 over a network. When the central unit 2 or the device connected to the central unit through the network receives the acquisition request, it encrypts the contents information into a form that can be decoded only by a decoding key corresponding to the user information, and transmits the encrypted information to the terminal unit. Thus, even when a malicious third party who has illegally acquired the program by image copies of the RAM 12, etc. and reverse-analyzed the program obtains the decoding key information by the reverse analysis, the third party cannot specify an address in the program at which the decoding key information is embedded because the decoding key information is changed and the load module is transformed each time the program is obtained. For instance, the third party cannot decode the contents information stored in the central unit 2 or the device connected to the central unit 2. Thus, it is possible to prevent the third party from illegally using the contents information.

Moreover, as the essential information, not only information necessary for executing the program, but also information for computing information necessary for executing the program and a computation method may be used. In this case, not only the data of the essential information, but also the operating code dealing with the essential information can be simultaneously changed, and the resistance to reverse analysis by malicious third parties can be further improved.

As described above, according to Embodiment 1, each time the CPU 11 of the terminal unit 1 transmits an acquisition request signal, the program to be executed is updated by the central unit. It is therefore difficult to perform reverse analysis to find which portion of the acquired load module is the essential information necessary for executing the program. Besides, even when the reverse analysis is successfully completed, if the essential information necessary for executing the program is updated by the central unit, it is impossible to use the reverse-analyzed essential information and the load module using the essential information, thereby preventing illegal execution of the program.

Further, the program is not created in the terminal unit 1 to which the user is always accessible but is created in the central unit 2 that can strictly manage the persons having access rights. Consequently, it is difficult for malicious third parties to analyze the transformation method of the load module of the program, and it is possible to effectively prevent illegal use.

Embodiment 2

The following description will specifically explain a computer system according to Embodiment 2 of the present invention based on the drawings. The configuration of the computer system of Embodiment 2 is the same as that of Embodiment 1. A program to be executed by the terminal unit is divided into sub-programs in advance, and the sub-programs thus made are respectively stored on the storage sections 13 of the terminal unit and the storage means 23 of the central unit. The storage means 13 includes a sub-program storage section 131 for storing the sub-program made by division. Besides, the storage means 23 of the central unit holds a source code instead of a load module of a sub-program. Further, in Embodiment 2, instead of performing the process of creating a load module of a sub-program to be transmitted to the terminal unit 1 each time an acquisition request for the sub-program is transmitted as explained in Embodiment 1, the central unit 2 reverse-analyzes the source code for the sub-program stored in the program storage section 231 at appropriate time intervals, and compiles and links the source code to create a load module in which the essential information is embedded.

Figure 7:
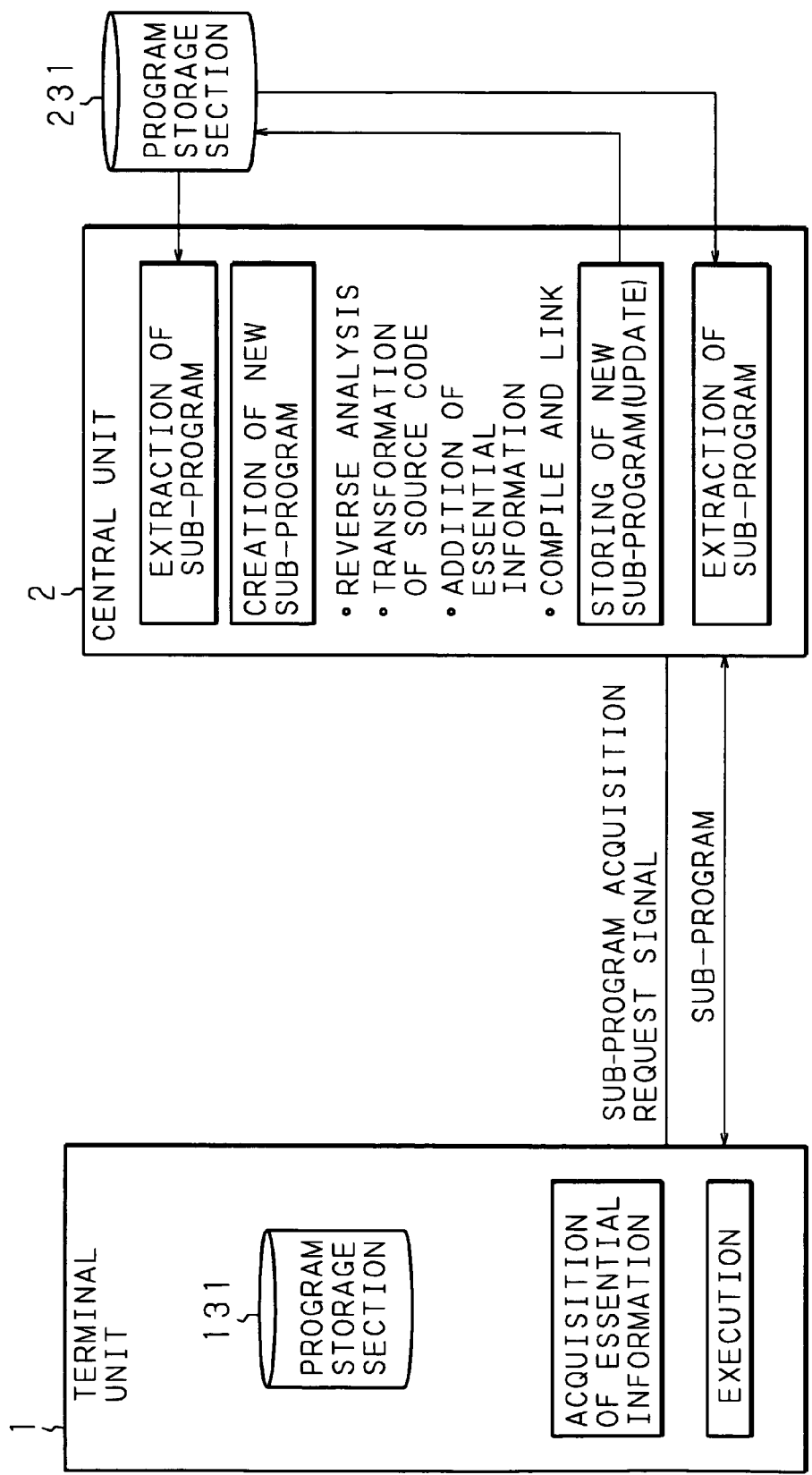
FIG. 7 is a block diagram illustrating the operation for executing a program by a computer system according to Embodiment 2 of the present invention.

FIG. 7 is a view illustrating the operation for executing a program by the computer system according to Embodiment 2 of the present invention. First, a program to be executed is divided into a plurality of sub-programs of a predetermined unit size. A part of the divided program is stored in the program storage section 131 of the terminal unit 1 which mainly executes the program. The remaining sub-programs are stored in the program storage section 231 of the central unit 2.

When executing the program, the CPU 11 of the terminal unit 1 transmits a sub-program acquisition request signal to the central unit 2 over the Internet 3 at a timing of executing a sub-program which is not present in the program storage section 131 of the terminal unit 1 but is present in the program storage section 231 of the central unit 2. The central unit 2 that has received the sub-program acquisition request signal extracts a sub-program to be executed from the sub-programs stored in the program storage section 231, according to the acquisition request signal.

Irrespective of whether or not the sub-program acquisition request has been received from the terminal unit 1, the CPU 21 of the central unit 2 follows the same processing procedure as in Embodiment 1 and creates a load module of a new sub-program to be transmitted to the terminal unit 1 based on the sub-program at appropriate time intervals. More specifically, the CPU 21 reverse-analyzes the source code for the sub-program corresponding to the acquisition request, and changes the source code into a program which produces the same computation results but has different source code, or changes the compile and link process. Here, "changing the compile and link process" means creating a load module having a different instruction code or address allocation from the same source code. By changing the source code or the compile and link process, a different load module is created each time a load module is created. Then, by reading the essential information from the essential information storage section 232 and embedding it into the load module, a load module of a new sub-program to be transmitted to the terminal unit 1 is created. In order to execute the above-mentioned process at appropriate time intervals, the process may be executed using cron, for example.

When the CPU 21 of the central unit 2 receives the sub-program acquisition request from the terminal unit 1, it transmits the sub-program of the latest state to the terminal unit 1 that has transmitted the acquisition request. In the case where the program is executed by the terminal unit 1, processing is performed based on the embedded essential information. For example, contents information, held in the central unit 2 or a device connected to the central unit 2 over a network, is encrypted at appropriate time intervals with a different encryption key, and a decoding key for the contents information is embedded as the essential information. Then, the terminal unit 1 obtains the encrypted contents information from the central unit 2 or the device connected to the central unit 2 over a network, and decodes the contents information based on the decoding key information that is the embedded essential information for use.

FIGS. 8A-8C and 9A-9C are views illustrating the structures of sub-programs and the written state on the RAM 12 of the terminal unit 1 after receiving the sub-programs. First, a program to be executed is divided into a plurality of sub-programs 51 through 53. When dividing the program into sub-programs, in a portion where it is necessary to call and execute another sub-program from a sub-program, an acquisition request code for another sub-program to be called is embedded.

Figure 8A:
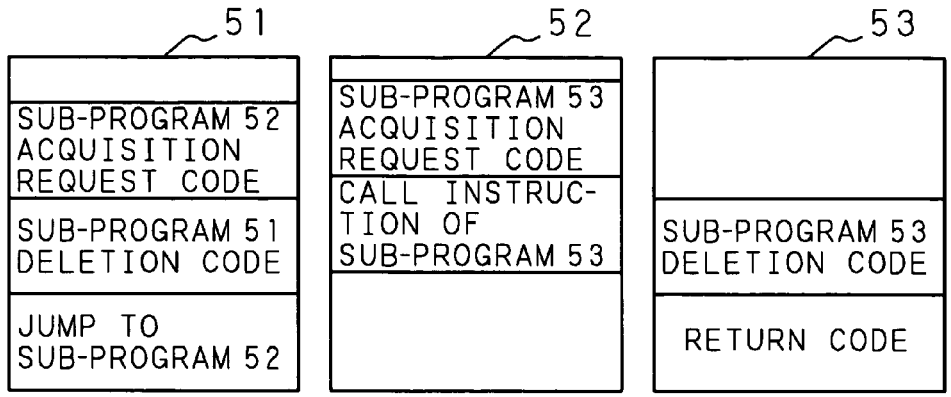
FIG. 8A is a view illustrating an example of sub-programs created by a central unit.

FIG. 8A is a view illustrating an example of sub-programs created by the central unit 2. In FIGS. 8A-8C and 9A-9C, in order to explain the written state on the RAM 12, explanation about the essential information is omitted. Besides, this example uses an example in which analysis is made more difficult by deleting the sub-programs. However, even when the essential information is only updated by acquiring a sub-program from the central unit whenever necessary, analysis can be made more difficult by updating the essential information and transforming the load module.

In FIG. 8A, in the case where a sub-program is unnecessary after completing the execution of the sub-program, a code for deleting the sub-program from the RAM 12 is embedded. For example, since switching from the sub-program 51 to the sub-program 52 is controlled by a jump instruction, the sub-program 51 will never be executed after jumping to the sub-program 52. Therefore, as shown in FIG. 8A, the code for deleting the sub-program 51 is embedded just before the jump code of the sub-program 51.

On the other hand, the sub-program 53 is called from the sub-program 52 and executed as a sub-module. In this case, the sub-program 53 may also be deleted after completing the execution of the sub-program 53. Therefore, as shown in FIG. 8A, a code for deleting the sub-program 53 is embedded before a return code of the sub-program 53 for returning to the sub-program 52.

Figure 8B:
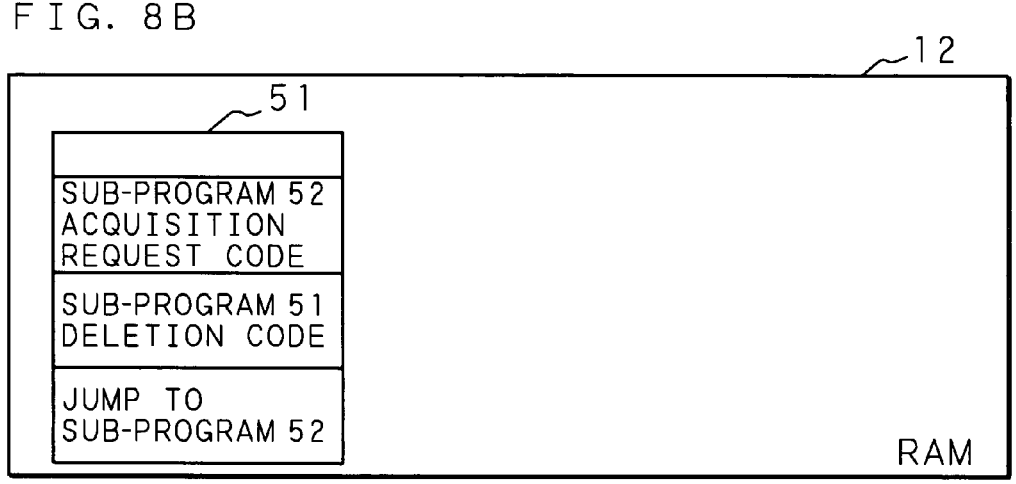
FIG. 8B is a view illustrating the state of a RAM when a sub-program to be executed first is loaded.

FIG. 8B is a view illustrating the state of the RAM 12 when the sub-program 51 to be executed first has been loaded.

According to the execution of the sub-program 51, a request code for acquiring the sub-program 52 is executed.

Figure 8C:
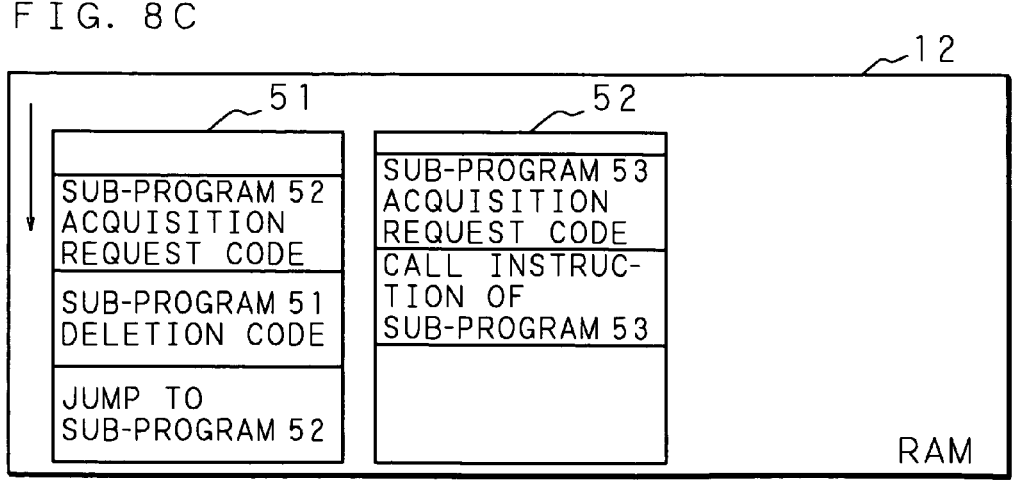
FIG. 8C is a view illustrating a state in which sub-programs received by a terminal unit are written on the RAM.

When the request code for acquiring the sub-program 52 is executed, an acquisition request for the sub-program 52 is transmitted to the central unit 2 from the terminal unit 1. The central unit 2 transmits the sub-program 52 which has been changed by the above-described processing to the terminal unit 1. FIG. 8C is a view illustrating a state in which the sub-program 52 received by the terminal unit 1 is written on the RAM 12.

Figure 9A:
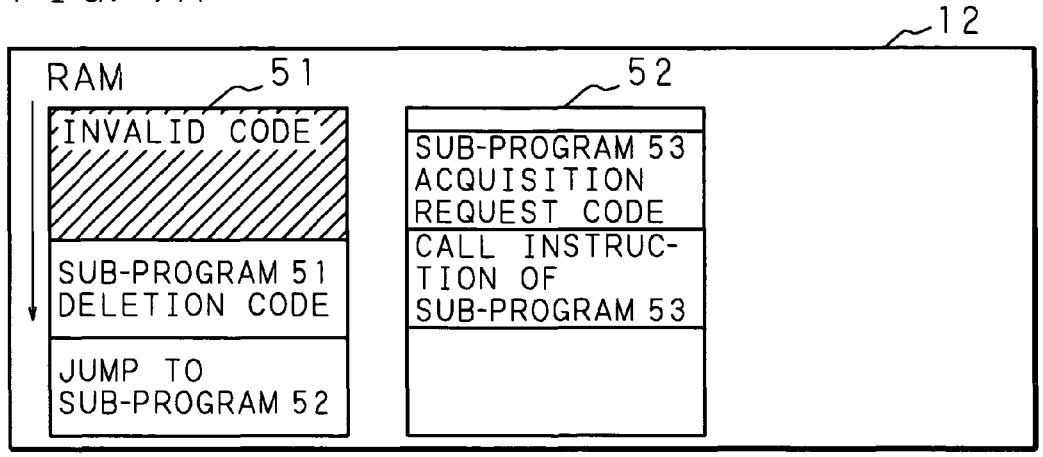
FIG. 9A is a view illustrating a state in which a sub-program is deleted from the RAM.

Subsequently, the code for deleting the sub-program 51 is executed, and the sub-program 51 is deleted from the RAM 12. FIG. 9A is a view illustrating a state in which the sub-program 51 is deleted from the RAM 12. As shown in FIG. 9A, when deleting the sub-program 51 from the RAM 12, an invalid code, for example, NOP, is written in a region other than the jump code to the sub-program 52.

Figure 9B:
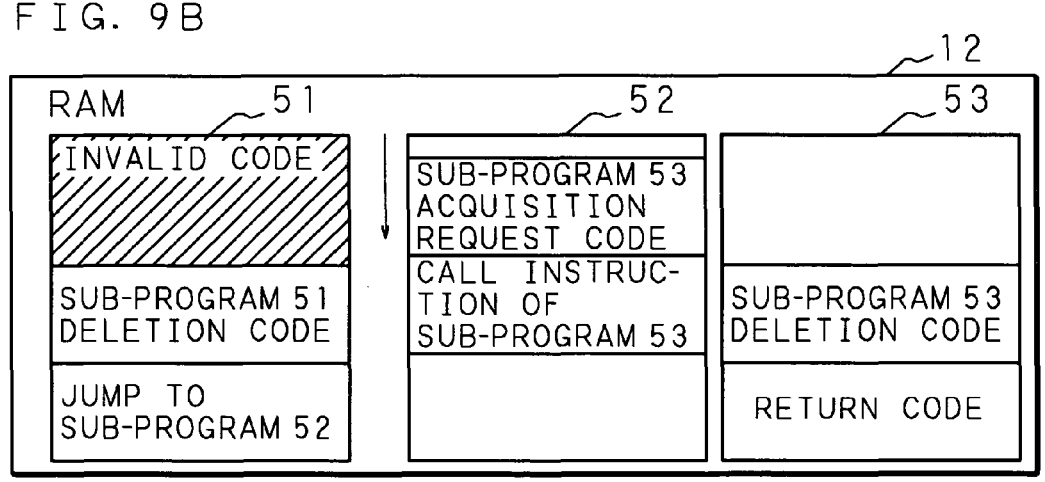
FIG. 9B is a view illustrating a state in which sub-programs received by the terminal unit are written on the RAM.

By jumping to the sub-program 52 and executing the sub-program 52, an acquisition request for the sub-program 53 is executed. In response to the acquisition request, the central unit 2 also transmits the source code for the sub-program 53 to the terminal unit 1 after transforming the source code. FIG. 9B is a view illustrating a state in which the sub-program 53 received by the terminal unit 1 is written on the RAM 12.

Figure 9C:
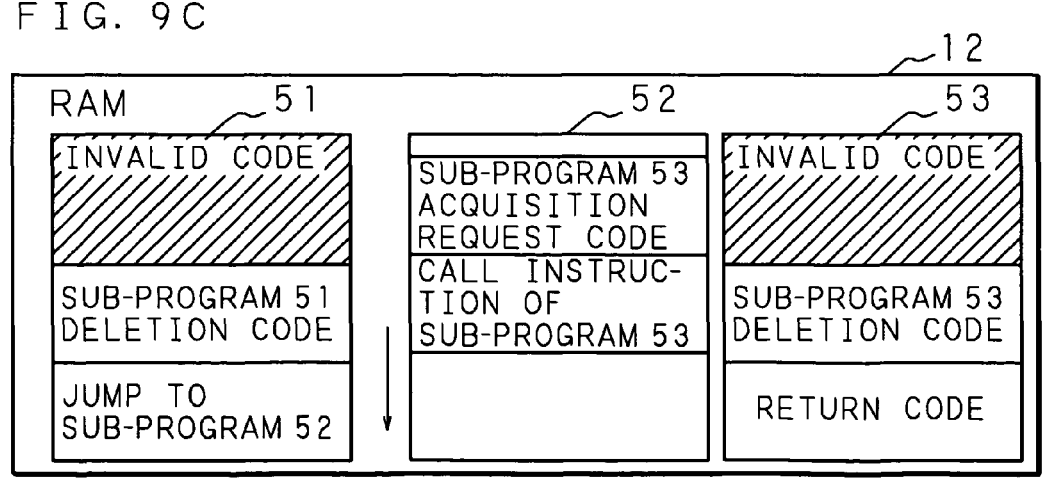
FIG. 9C is a view illustrating a state in which a sub-program is deleted from the RAM.

Thereafter, the sub-program 53 is executed, and the code for deleting the sub-program 53 is executed just before a return. FIG. 9C is a view illustrating a state in which the sub-program 53 is deleted from the RAM 12. As shown in FIG. 9C, when deleting the sub-program 53 from the RAM 12, the sub-program 53 is deleted from the RAM 12 by writing an invalid code, for example, NOP, in a region other than the return code.

Figure 5:
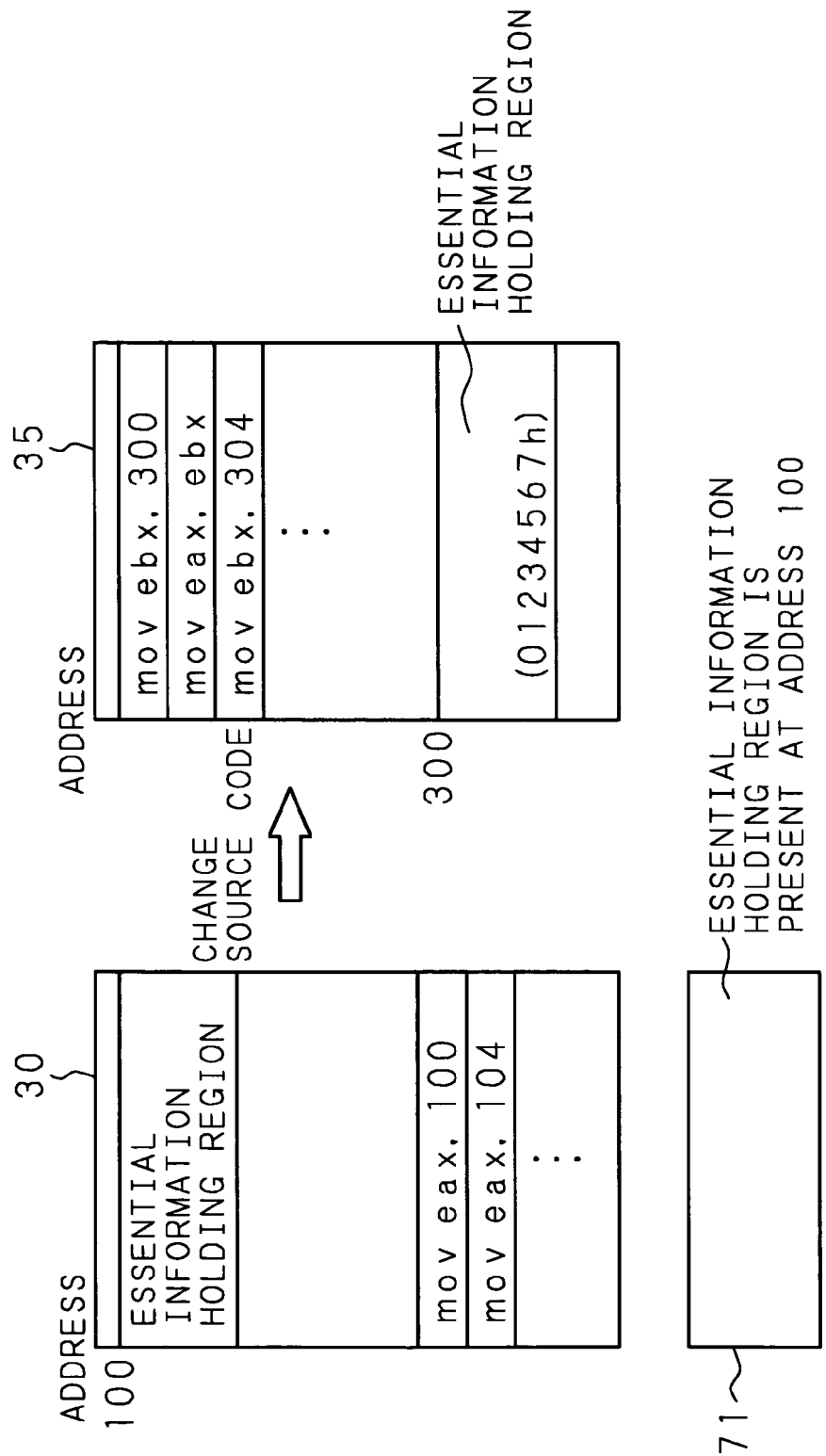
FIG. 5 is a view illustrating an example of an embedding method for embedding essential information into a source code.

Before executing the sub-program, the essential information embedded in the sub-program written on the RAM 12 is extracted. FIG. 5 is a view illustrating an example of an embedding method for embedding some secret information as essential information into a source code. As shown in FIG. 5, a region for holding the secret information is present in the source code 30 of the original sub-program. The region for holding the secret information is designed so that it can be detected by analyzing additional information to source code 50 for the original sub-program, or the source code 50 of the original sub-program. In FIG. 5, additional information 71 indicating that the secret information holding region is present at the 100th byte of the source code of the original sub-program is stored in the essential information storage section 232.

Therefore, a malicious third party who has illegally acquired a sub-program by image copies of the RAM 12, etc. cannot specify an address in the sub-program at which the essential information is embedded, and cannot receive transmission of execution permission information by the central unit 2. It is thus possible to prevent the third party from illegally executing the program.

As described above, according to Embodiment 2 of the present invention, by creating a sub-program to be transmitted to the terminal unit 1 at certain cycles irrespective of an acquisition request signal transmitted by the CPU 11 of the terminal unit 1, it is possible to obtain the effect of making it difficult for third parties to perform reverse analysis. Besides, even when a third party has succeeded in reverse analysis, since the essential information and sub-program dealing with the essential information are changed at appropriate time intervals, the third party cannot use the essential information and load module obtained by the reverse analysis.

Moreover, by dividing a program into sub-programs and deleting a sub-program from the memory after use or overwriting a sub-program with invalid data after use, it is possible to make it difficult for malicious third parties to reverse-analyze the load module of the program. In addition, it is possible to effectively prevent illegal use.

Further, a sub-program is not created by the terminal unit 1 to which the user is always accessible but is created by the central unit 2 that can strictly manage the persons having access rights. Thus, it is difficult for malicious third parties to analyze the change in the source code for the sub-program or the compile and link process, and it is possible to effectively prevent illegal use.

As this invention may be embodied in several forms without departing from the spirit of essential characteristics thereof, the present embodiments are therefore illustrative and not restrictive, since the scope of the invention is determined by the appended claims rather than by the description preceding them, and all changes that fall within metes and bounds of the claims, or equivalence of such metes and bounds thereof are therefore intended to be embraced by the claims.

The invention claimed is:

1. A computer system, comprising:

a central unit; and one or a plurality of terminal units connected to the central unit, wherein load modules of a program to be executed by the terminal unit are stored on a first memory of the central unit, and a necessary program is acquired from the central unit and executed by the terminal unit, the terminal unit comprises a unit transmitting an acquisition request for a program to the central unit, the central unit comprises:

the first memory of the central unit;

a program storage storing load modules of the program to be executed by the terminal unit on the first memory;

an essential information storage storing essential information necessary for executing the program;

a unit analyzing the load modules of the program extracted from the program storage by an acquisition request for the program received from the terminal unit;

a unit creating new load modules each having command codes different from command codes of the load module of the program extracted from the program storage, the command codes of the new load module being located at an area before an address where the essential information read from the essential information storage is to be embedded, to produce same computation results, and the command codes of the new load module being located in differing location where the essential information of the new load module is to be embedded from location where the essential information of the extracted load module is to be embedded;

a unit transmitting the new load modules of the program together with the essential information to the terminal unit, and the terminal unit further comprises:

a second memory;

a unit receiving the load modules of the program transmitted by the central unit;

a unit storing the received load module of the program on the second memory; and a unit acquiring information necessary for executing the load modules of the program based on the essential information from the central unit or a device connected to the central unit via a network, the central unit divides a program to be executed by the terminal unit in advance and stores a part of the sub-programs thus made on the first memory, and further comprises a unit creating a load module of a sub-program different from the program, which produces same computation results and differs in the location where the essential information is to be embedded, once the acquisition request is received from the terminal unit, the terminal unit stores other sub-programs on the second memory, and further comprises:

a unit receiving the sub-program transmitted by the central unit;

a unit storing the received sub-program on the second memory; and a unit acquiring a necessary sub-program from the central unit and executing the program the terminal unit transmits user information to the central unit upon requesting acquisition of a program, the central unit or a device connected to the central unit over a network stores the essential information in association with the user information, and the terminal unit transmits the user information to the central unit or the device connected to the central unit over a network so as to allow only an authorized user to execute the program based on the essential information corresponding to the user information.

2. A computer system comprising:

a central unit; and one or a plurality of terminal units connected to the central unit, wherein load modules of a program to be executed by the terminal unit are stored on a first memory of the central unit, and a necessary program is acquired from the central unit and executed by the terminal unit, the terminal unit comprises a unit transmitting an acquisition request for a program to the central unit, the central unit comprises:

the first memory of the central unit;

a program storage storing load modules of the program to be executed by the terminal unit on the first memory;

an essential information storage storing essential information necessary for executing the program;

a unit analyzing the load module of the program extracted from the program storage by an acquisition request for the program received from the terminal unit;

a unit creating new load modules each having command codes different from command codes of the load module of the program extracted from the program storage, the command codes of the new load module being located at an area before an address where the essential information read from the essential information storage is to be embedded, to produce same computation results, and the command codes of the new load module being located in differing location where the essential information of the new load module is to be embedded from location where the essential information of the extracted load module is to be embedded; and a unit transmitting the new load modules of the program together with the essential information to the terminal unit, the terminal unit further comprises:

a second memory;

a unit receiving the load modules of the program transmitted by the central unit;

a unit storing the received load module of the program on the second memory; and a unit acquiring information necessary for executing the load modules of the program based on the essential information from the central unit or a device connected to the central unit via a network, the central unit stores a source code for a program to be executed by the terminal unit on the first memory, and further comprises:

a unit changing the source code for the program located at an area before the address where the essential information is to be embedded or changing a compile and link process so as to create a load module of a program different from the program, which produces same computation results and differs in the location where the essential information is to be embedded, once the acquisition request is received from the terminal unit; and a unit transmitting the created load module of the program to the terminal unit the central unit divides a program to be executed by the terminal unit in advance and stores a part of the sub-programs thus made on the first memory, and further comprises a unit creating a load module of a sub-program different from the program, which produces same computation results and differs in the location where the essential information is to be embedded, once the acquisition request is received from the terminal unit, the terminal unit stores other sub-programs on the second memory, and further comprises:

a unit receiving the sub-program transmitted by the central unit;

a unit storing the received sub-program on the second memory; and a unit acquiring a necessary sub-program from the central unit and executing the program, the terminal unit transmits user information to the central unit upon requesting acquisition of a program, the central unit or a device connected to the central unit over a network stores the essential information in association with the user information, and the terminal unit transmits the user information to the central unit or the device connected to the central unit over a network so as to allow only an authorized user to execute the program based on the essential information corresponding to the user information.

3. A computer system comprising:

a central unit; and one or a plurality of terminal units connected to the central unit, wherein load modules of a program to be executed by the terminal unit are stored on a first memory of the central unit, and a necessary program is acquired from the central unit and executed by the terminal unit, the terminal unit comprises a unit transmitting an acquisition request for a program to the central unit, the central unit comprises:

the first memory of the central unit;

a program storage storing load modules of the program to be executed by the terminal unit on the first memory;

an essential information storage storing essential information necessary for executing the program;

a unit analyzing the load module of the program extracted from the program storage by an acquisition request for the program received from the terminal unit;

a unit creating new load modules each having command codes different from command codes of the load module of the program extracted from the program storage, the command codes of the new load module being located at an area before an address where the essential information read from the essential information storage is to be embedded, to produce same computation results, and the command codes of the new load module being located in differing location where the essential information of the new load module is to be embedded from location where the essential information of the extracted load module is to be embedded; and a unit transmitting the new load modules of the program together with the essential information to the terminal unit, and the terminal unit further comprises:

a second memory;

a unit receiving the load modules of the program transmitted by the central unit;

a unit storing the received load module of the program on the second memory; and a unit acquiring information necessary for executing the load modules of the program based on the essential information from the central unit or a device connected to the central unit via a network, the central unit divides a program to be executed by the terminal unit in advance and stores a part of the sub-programs thus made on the first memory, and further comprises:

a unit creating a load module of a sub-program different from the program, which produces same computation results and differs in the location where the essential information is to be embedded, once the acquisition request is received from the terminal unit, the terminal unit stores other sub-programs on the second memory, and further comprises:

a unit receiving the sub-program transmitted by the central unit;

a unit storing the received sub-program on the second memory; and a unit acquiring a necessary sub-program from the central unit and executing the program, the terminal unit further comprises:

a unit deleting an executed sub-program from the second memory after executing the sub-program, or a unit overwriting the sub-program on the second memory with invalid data, the terminal unit transmits user information to the central unit upon requesting acquisition of a program, the central unit or a device connected to the central unit over a network stores the essential information in association with the user information, and the terminal unit transmits the user information to the central unit or the device connected to the central unit over a network so as to allow only an authorized user to execute the program based on the essential information corresponding to the user information.

* * * * *